United States Patent
Jing et al.

(10) Patent No.: US 9,581,837 B2
(45) Date of Patent: Feb. 28, 2017

(54) WEARABLE APPARATUS, DETECTION SYSTEM AND DETECTION METHOD

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Hui Jing, Beijing (CN); Zhubing Huang, Beijing (CN); Xiaofeng Wang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/744,497

(22) Filed: Jun. 19, 2015

(65) Prior Publication Data

US 2016/0139429 A1     May 19, 2016

(30) Foreign Application Priority Data

Nov. 19, 2014    (CN) .......................... 2014 1 0662885

(51) Int. Cl.
    *G02F 1/13*        (2006.01)
    *G02C 7/10*        (2006.01)
               (Continued)

(52) U.S. Cl.
    CPC .......... *G02C 7/101* (2013.01); *B29D 11/0073* (2013.01); *G02C 7/104* (2013.01);
               (Continued)

(58) Field of Classification Search
    CPC ....... G02F 1/1313; G02C 7/101; G02C 7/104; G02C 7/12; G02C 7/16; B29D 11/0073
    See application file for complete search history.

(56) References Cited

U.S. PATENT DOCUMENTS

| | | | | |
|---|---|---|---|---|
| 5,355,183 A | * | 10/1994 | Andrea | .................... G02C 7/12 |
| | | | | 351/135 |
| 5,382,986 A | * | 1/1995 | Black | .................... G02C 7/101 |
| | | | | 250/372 |

(Continued)

FOREIGN PATENT DOCUMENTS

| | | |
|---|---|---|
| CN | 2496048 Y | 6/2002 |
| CN | 1715887 A | 1/2006 |

(Continued)

OTHER PUBLICATIONS

1st office action issued in Chinese Application No. 201410662885.1 dated Sep. 6, 2015.

(Continued)

*Primary Examiner* — James Dudek
(74) *Attorney, Agent, or Firm* — Nath, Goldberg & Meyer; Joshua B. Goldberg; Scott Blackman

(57) ABSTRACT

Embodiments of the present invention provide a wearable apparatus, a detection system and a detection method. The wearable apparatus includes a frame, a controller and LCD lenses. The controller and the LCD lenses are provided on the frame. The frame is used for fixing the LCD lenses in front of human eyes, the controller is used for applying a predetermined voltage to the LCD lenses, and the LCD lenses are used for displaying a color corresponding to the predetermined voltage according to the applied predetermined voltage, so that the detection system, in which the wearable apparatus is applied, can detect qualified rate of the display panel under light with any colors by equipping with a white light source only, thereby reducing the apparatus cost. In addition, it is possible to switch over among different display colors conveniently and efficiently for the wearable apparatus, thereby improving the efficiency of detection.

20 Claims, 4 Drawing Sheets

(51) Int. Cl.
*G02C 7/12* (2006.01)
*G02C 7/16* (2006.01)
*B29D 11/00* (2006.01)

(52) U.S. Cl.
CPC ............... *G02C 7/12* (2013.01); *G02C 7/16* (2013.01); *G02F 1/1313* (2013.01)

(56) References Cited

U.S. PATENT DOCUMENTS

2010/0066971 A1* 3/2010 Kamiya .................. G02C 7/12
351/49
2013/0235286 A1 9/2013 Hung

FOREIGN PATENT DOCUMENTS

| CN | 101620321 A | 1/2010 |
| CN | 202204988 U | 4/2012 |

OTHER PUBLICATIONS

2nd office action issued in Chinese Application No. 201410662885.1 dated Jan. 14, 2016.
Third Office Action dated May 24, 2016 corresponding to Chinese application No. 201410662885.1.

* cited by examiner

WEARABLE APPARATUS, DETECTION SYSTEM AND DETECTION METHOD

FIELD OF THE INVENTION

The present invention relates to the field of display technology, and particularly relates to a wearable apparatus, a detection system and a detection method.

BACKGROUND OF THE INVENTION

In manufacturing process of a display panel, detection process is a critical process which tests characteristics of the display panel, and is also a very important step in various processes. At present, mainstream detection apparatuses are each equipped with a light source system for various colors such as yellow, white, green and the like. By switching light sources for various colors, light with various colors is irradiated on the display panel, so that the purpose of detecting whether or not the display panel is qualified can be achieved. Accordingly, almost all of the detection apparatuses are equipped with the light source system for various colors, resulting in a low efficiency in detection and high cost.

SUMMARY OF THE INVENTION

In view of the above problems, embodiments of the present invention provide a wearable apparatus, a detection system and a detection method, for solving the problems of low efficiency in detection and high cost in the existing detection apparatuses.

According to an embodiment of the present invention, there is provided a wearable apparatus, including a frame, a controller and LCD lenses, wherein the controller and the LCD lenses are provided on the frame; the frame is used for fixing the LCD lenses in front of human eyes; the controller is used for applying a predetermined voltage to the LCD lenses; and the LCD lenses are used for displaying a color corresponding to the predetermined voltage according to the applied predetermined voltage.

The LCD lenses may also display a grayscale corresponding to the predetermined voltage according to the applied predetermined voltage.

The wearable apparatus may further include at least one slotted part, which is provided at the outer side of the LCD lens. The slotted part is provided therein with an accommodating portion that is used for accommodating a filter or a polarizer. The shape of the filter or the polarizer and the shape of the accommodating portion are set correspondingly.

The wearable apparatus may further include a rotation shaft and a slotted part, wherein the slotted part is provided therein with a filter or a polarizer, the slotted part is rotatably connected with the frame via the rotation shaft, and the slotted part is rotated about the rotation shaft to cover or expose the LCD lens.

The filter may be provided thereon with a first handle, and the first handle is fixedly connected with edge of the filter.

The polarizer may be provided thereon with a second handle, and the second handle is fixedly connected with edge of the polarizer.

The wearable apparatus may further include a hood, which is provided at the inner side of the LCD lens and is arranged around the LCD lens. The hood is used for surrounding the human eye.

According to an embodiment of the present invention, there is further provided a detection system, including any one of the above wearable apparatuses.

The wearable apparatus may be spectacles, a helmet or a mask.

According to an embodiment of the present invention, there is further provided a detection method, in which a wearable apparatus is applied, the wearable apparatus includes a frame, a controller and LCD lenses, wherein the controller and the LCD lenses are provided on the frame, the controller is used for applying a predetermined voltage to the LCD lenses, and the LCD lenses are used for displaying a color corresponding to the predetermined voltage according to the applied predetermined voltage, the detection method includes:

fixing the LCD lenses in front of human eyes by using the frame; and applying a predetermined voltage to the LCD lenses through the controller, so that the LCD lenses displays a color corresponding to the predetermined voltage under the action of the predetermined voltage.

The beneficial effects of the present invention are as below.

According to the wearable apparatus, detection system and the detection method provided by embodiments of the present invention, the wearable apparatus includes a frame, a controller and LCD lenses, the controller and the LCD lenses being provided on the frame. The controller is used for applying a predetermined voltage to the LCD lenses, and the LCD lenses are used for displaying a color corresponding to the predetermined voltage according to the applied predetermined voltage, so that the detection system equipped only with a white light source can detect the qualified rate of the display panel under light with any colors, thereby reducing apparatus cost. In addition, it is possible to switch over among different display colors conveniently and efficiently for the wearable apparatus, thereby improving the efficiency of the detection.

DETAILED DESCRIPTION OF THE EMBODIMENTS

To make those skilled in the art better understand the technical solutions of the present invention, a wearable apparatus, a detection system and a detection method provided by embodiments of the present invention will be described below in detail in conjunction with the accompanying drawings.

Embodiment 1

In the present embodiment, the structure of the wearable apparatus will be described below in detail. It should be noted that spectacles will be described as an example of the wearable apparatus according to the principle of the present invention. However, other wearable apparatuses, based on the principle of the present invention, also fall within the protection scope of the present invention.

Figure 1:
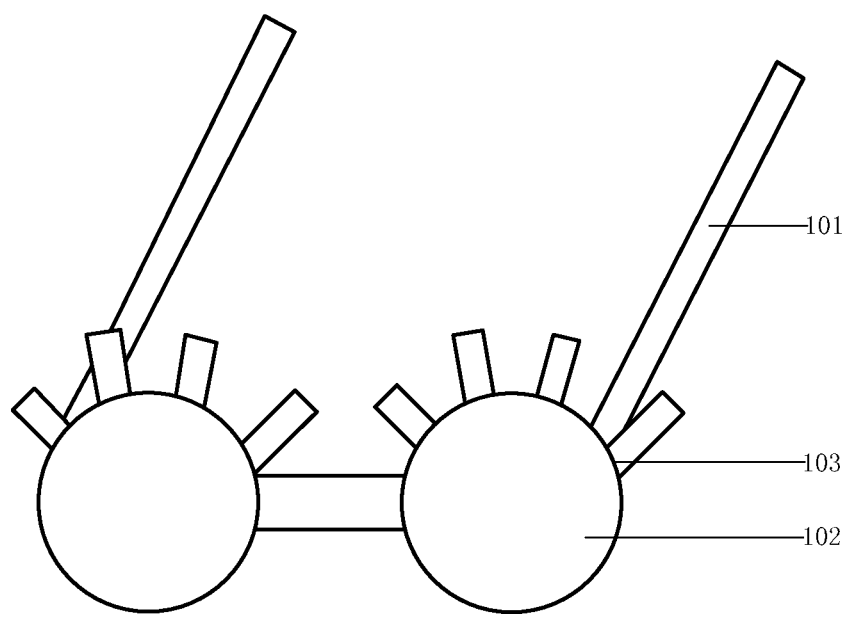
FIG. 1 is a diagram of a structure of a wearable apparatus provided by Embodiment 1 of the present invention.

FIG. 1 is a diagram of a structure of a wearable apparatus provided by embodiment 1 of the present invention. As described above, spectacles will be described as an example of the wearable apparatus according to the principle of the present invention, but the wearable apparatus may also be a helmet, a mask, or the like. As shown in FIG. 1, the spectacles include a frame 101, a controller (not shown) and LCD lenses 102, wherein the controller and the LCD lenses 102 are provided on the frame 101. Specifically, two LCD lenses 102 are provided, and the spectacles further include two lens-frame parts provided on the frame 101. Each of the lens-frame parts corresponds to one of the LCD lenses 102, and each of the LCD lenses 102 is provided within a lens-frame part corresponding thereto. One of the LCD lenses 102 corresponds to the left eye and the other corresponds to the right eye.

In the present embodiment, the frame 101 is used for fixing the LCD lenses 102 in front of human eyes, the controller is used for applying a predetermined voltage to the LCD lenses 102 and the LCD lenses 102 are used for displaying a color corresponding to the predetermined voltage according to the applied predetermined voltage. Correspondences between voltages and colors are set in the controller in advance. In actual detection procedures, when light with a certain color is required for a detection system, a predetermined voltage corresponding to the color is applied to the LCD lenses 102, so that the LCD lenses 102 display the color. The detection system, in which the wearable apparatus provided by the present embodiment is used, can detect the qualified rate of the display panel under light with any colors by equipping with a white light source only, thus it is conveniently and efficiently to use, thereby improving the efficiency of the detection.

Preferably, the LCD lenses 102 may also display a grayscale corresponding to the predetermined voltage according to the applied predetermined voltage. Correspondences between voltages and grayscales are set in the controller in advance. In actual detection procedures, when light with a certain grayscale is required for a detection system, a predetermined voltage corresponding to the grayscale is applied to the LCD lenses 102, so that the LCD lenses 102 display the grayscale. The detection system, in which the wearable apparatus provided by the present embodiment is used, can detect the qualified rate of the display panel under light with any grayscales by equipping with a white light source only, thus it is conveniently and efficiently to use, thereby improving the efficiency of the detection.

In the present embodiment, the wearable apparatus may further include a plurality of filters 103.

Figure 2:
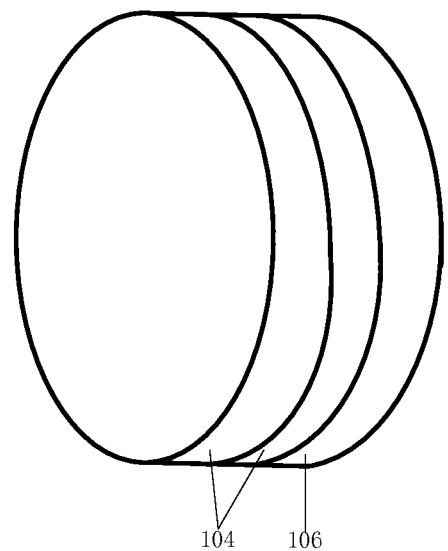
FIG. 2 is a stereogram of slotted parts and a lens-frame part for the wearable apparatus shown in FIG. 1.

FIG. 2 is a stereogram of slotted parts and the lens-frame part for the wearable apparatus shown in FIG. 1. As an optional implementation, the wearable apparatus may further include at least one slotted part 104, which is provided at the outer side of the LCD lens 102 (i.e., the side away from human eyes when in use), and the LCD lens 102 is provided within the lens-frame part 106. The slotted part 104 is provided therein with an accommodating portion (not shown in this figure) that is used for accommodating the filter 103. The shape of the filter 103 and the shape of the accommodating portion are set correspondingly. When the filter 103 is required, the filter 103 may be provided in the accommodating portion, so that the filter 103 is installed in the slotted part 104. When a plurality of the filters 103 are required, the plurality of the filters 103 may be respectively provided in a plurality of accommodating portions, so that the plurality of the filters 103 are installed in a plurality of the slotted parts 104 to achieve a combination of multiple filters. When no filter 103 is required, the filter 103 may be removed from the accommodating portion, so that the filter 103 is uninstalled from the slotted part 104.

Alternatively, the wearable apparatus may further include a rotation shaft and the slotted part 104, in which the filter 103 is provided. The slotted part 104 is rotatably connected with the frame 101 via the rotation shaft. The slotted part 104 covers or exposes the LCD lens 102 by rotating about the rotation shaft. When the filter 103 is required, the slotted part 104, in which the filter 103 is provided, may rotate about the rotation shaft so as to cover the LCD lens 102. When the filter 103 is not required, the slotted part 104 may rotate about the rotation shaft so as to expose the LCD lens 102.

Figure 3:
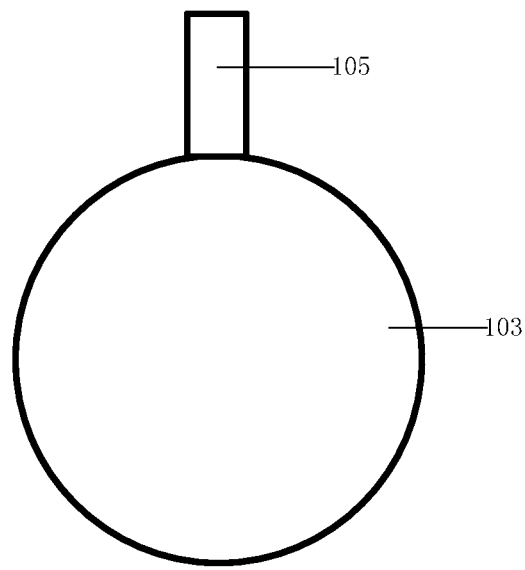
FIG. 3 is a diagram of a structure of a filter for the wearable apparatus shown in FIG. 1.

Preferably, as shown in FIG. 3, the filter 103 is provided thereon with a first handle 105, and the first handle 105 is fixedly connected with edge of the filter 103. The filter 103 can be installed in the slotted part 104 through the first handle 105. By providing the first handle 105, the filter 103 can be installed in the slotted part 104 more conveniently and efficiently, thereby improving the efficiency of operations.

In the present embodiment, as an optional implementation, the accommodating portion is also used for accommodating a polarizer. The shape of the polarizer and the shape of the accommodating portion are set correspondingly. When the polarizer is required, the polarizer may be provided in the accommodating portion, so that the polarizer is installed in the slotted part 104. When a plurality of the polarizers are required, the plurality of the polarizers may be respectively provided in a plurality of accommodating portions, so that the plurality of the polarizers are installed in a plurality of the slotted parts 104 to achieve a combination of multiple polarizers. When no polarizer is required, the polarizer may be removed from the accommodating portion, so that the polarizer is uninstalled from the slotted part 104. In actual applications, the filters and the polarizers may also be provided in the plurality of the slotted parts 104 simultaneously to achieve a combination of the filters and the polarizers.

Alternatively, the wearable apparatus may further include a rotation shaft and the slotted part 104, in which the polarizer is provided. The slotted part 104 is rotatably connected with the frame 101 via the rotation shaft. The slotted part 104 covers or exposes the LCD lens 102 by rotating about the rotation shaft. When the polarizer is required, the slotted part 104, in which the polarizer is provided, may rotate about the rotation shaft so as to cover the LCD lens 102. When the polarizer is not required, the slotted part 104 may rotate about the rotation shaft so as to expose the LCD lens 102.

Figure 4:
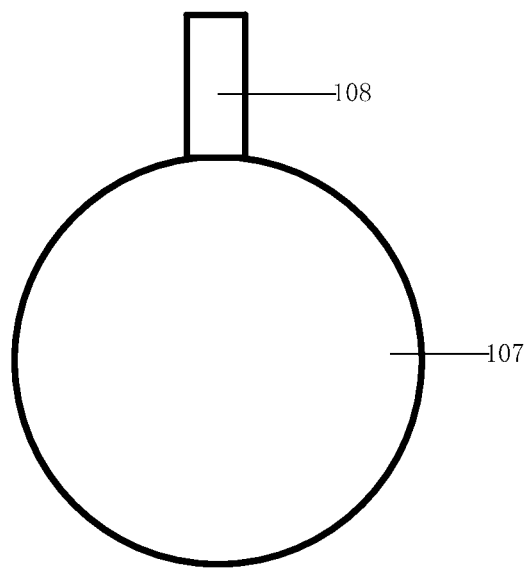
FIG. 4 is a diagram of a structure of a polarizer for the wearable apparatus shown in FIG. 1.

FIG. 4 is a diagram of a structure of a polarizer for the wearable apparatus shown in FIG. 1. As shown in FIG. 4, the polarizer 107 is provided thereon with a second handle 108, and the second handle 108 is fixedly connected with edge of the polarizer 107. The polarizer 107 can be installed in the slotted part 104 through the second handle 108. By providing the second handle 108, the polarizer 107 can be installed in the slotted part 104 more conveniently and efficiently, thereby improving the efficiency of operations.

Figure 5:
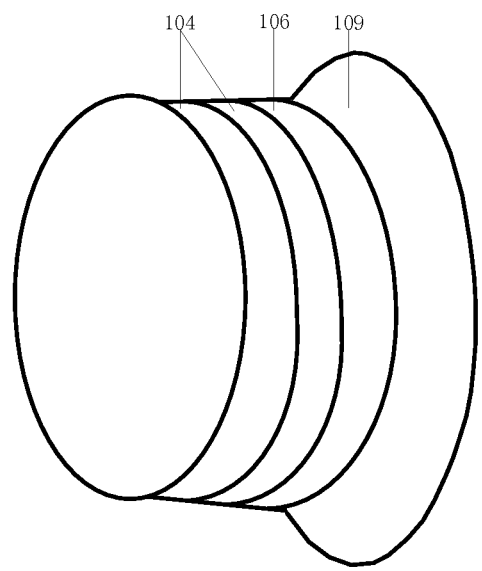
FIG. 5 is a stereogram of a combination of slotted parts, a lens-frame part and a hood.

FIG. 5 is a stereogram of a combination of slotted parts, a lens-frame part and a hood. As shown in FIG. 5, the wearable apparatus further includes a hood 109, which is provided at the inner side of the LCD lens 102 (i.e., the side close to human eyes when in use). The hood 109 is arranged around the LCD lens 102. The hood 109 is used for surrounding the human eye to achieve a close contact with a face, so that the impact of ambient light on use of the wearable apparatus can be avoided. Thus, for the wearable apparatus provided by the present embodiment, the demand on a darkroom is low, so that the production line is easy to be managed.

According to the wearable apparatus provided by the present embodiment, the wearable apparatus includes a frame, a controller and LCD lenses, the controller and the LCD lenses being provided on the frame. The controller is used for applying a predetermined voltage to the LCD lenses, and the LCD lenses are used for displaying a color corresponding to the predetermined voltage according to the applied predetermined voltage, so that the detection system equipped only with a white light source can detect the qualified rate of the display panel under light with any colors, thereby reducing apparatus cost. In addition, it is possible to switch over among different display colors conveniently and efficiently for the wearable apparatus, thereby improving the efficiency of the detection.

Embodiment 2

The present embodiment provides a detection system, including the wearable apparatus provided by embodiment 1. Details of the wearable apparatus can refer to the description made for embodiment 1, and will not be repeated here.

Preferably, the wearable apparatus may be spectacles, a helmet or a mask.

According to the detection system provided by the present embodiment, the wearable apparatus includes a frame, a controller and LCD lenses, the controller and the LCD lenses being provided on the frame. The controller is used for applying a predetermined voltage to the LCD lenses, and the LCD lenses are used for displaying a color corresponding to the predetermined voltage according to the applied predetermined voltage, so that the detection system equipped only with a white light source can detect the qualified rate of the display panel under light with any colors, thereby reducing apparatus cost. In addition, it is possible to switch over among different display colors conveniently and efficiently for the wearable apparatus, thereby improving the efficiency of the detection.

Embodiment 3

Figure 6:
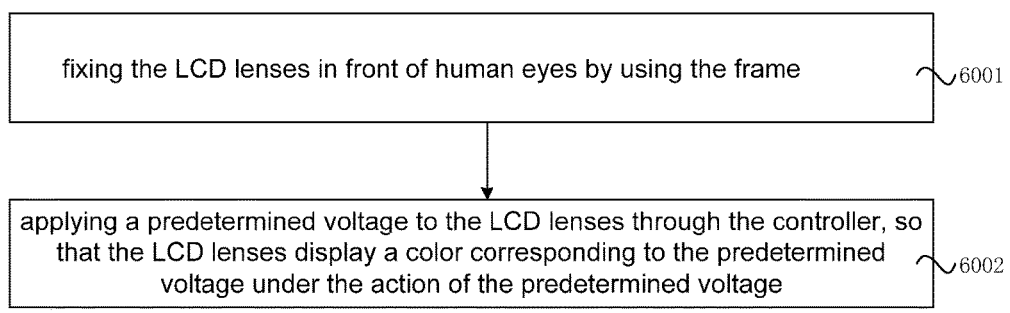
FIG. 6 is a flowchart of a detection method provided by Embodiment 3 of the present invention.

FIG. 6 is a flowchart of a detection method provided by an embodiment of the present invention, in which a wearable apparatus is applied.

In the present embodiment, the wearable apparatus includes a frame, a controller and LCD lenses, wherein the controller and the LCD lenses are provided on the frame. The controller is used for applying a predetermined voltage to the LCD lenses, and the LCD lenses are used for displaying a color corresponding to the predetermined voltage according to the applied predetermined voltage. Preferably, the wearable apparatus may be spectacles, a helmet or a mask.

As shown in FIG. 6, the detection method includes:

step 6001, fixing the LCD lenses in front of human eyes by using the frame; and step 6002, applying a predetermined voltage to the LCD lenses through the controller, so that the LCD lenses display a color corresponding to the predetermined voltage under the action of the predetermined voltage.

In the present embodiment, correspondences between voltages and colors are set in the controller in advance. In actual detection procedures, when light with a certain color is required for a detection system, a predetermined voltage corresponding to the color is applied to the LCD lenses, so that the LCD lenses display the color.

According to the detection method provided by the present embodiment, in which a wearable apparatus is applied, the wearable apparatus includes a frame, a controller and LCD lenses, the controller and the LCD lenses being provided on the frame. The controller is used for applying a predetermined voltage to the LCD lenses, and the LCD lenses are used for displaying a color corresponding to the predetermined voltage according to the applied predetermined voltage, so that the detection system equipped only with a white light source can detect the qualified rate of the display panel under light with any colors, thereby reducing apparatus cost. In addition, it is possible to switch over among different display colors conveniently and efficiently for the wearable apparatus, thereby improving the efficiency of the detection.

It could be understood that the foregoing implementations are merely exemplary implementations used for illustrating the principle of the present invention, rather than limiting the present invention thereto. Various modifications and improvements can be made for those skilled in the art without departing from the spirit and essence of the present invention. These modifications and improvements are also construed as falling within the protection scope of the present invention.

What is claimed is:

1. A wearable apparatus used in a detection system equipped with a white light source emitting white light, the detection system configured to detect a device to be detected, the wearable apparatus including a frame, a controller and LCD lenses, the controller and the LCD lenses being provided on the frame, wherein the frame is used for fixing the LCD lenses in front of human eyes;

the controller is used for applying a predetermined voltage to the LCD lenses; and the LCD lenses are used for displaying a color corresponding to the predetermined voltage according to the applied predetermined voltage, wherein the wearable apparatus enables the detection system to detect, under the white light, a qualified rate of the device to be detected under light with any color.

2. The wearable apparatus according to claim 1, wherein the LCD lenses are also used for displaying a grayscale corresponding to the predetermined voltage according to the applied predetermined voltage.

3. The wearable apparatus according to claim 1, further including at least one slotted part, wherein the slotted part is provided at the outer side of the LCD lens, the slotted part being provided therein with an accommodating portion that is used for accommodating a filter or a polarizer, and the shape of the filter or the polarizer and the shape of the accommodating portion being set correspondingly.

4. The wearable apparatus according to claim 1, further including a rotation shaft and a slotted part, wherein the slotted part is provided therein with a filter or a polarizer, the slotted part being rotatably connected with the frame via the rotation shaft, and the slotted part being rotated about the rotation shaft to cover or expose the LCD lens.

5. The wearable apparatus according to claim 3, wherein the filter is provided thereon with a first handle, the first handle being fixedly connected with edge of the filter, and wherein the device to be detected is a display panel.

6. The wearable apparatus according to claim 4, wherein the filter is provided thereon with a first handle, the first handle being fixedly connected with edge of the filter.

7. The wearable apparatus according to claim 3, wherein the polarizer is provided thereon with a second handle, the second handle being fixedly connected with edge of polarizer.

8. The wearable apparatus according to claim 4, wherein the polarizer is provided thereon with a second handle, the second handle being fixedly connected with edge of the polarizer, and wherein the device to be detected is a display panel.

9. The wearable apparatus according to claim 1, further including a hood, wherein the hood is provided at the inner side of the LCD lens and is provided around the LCD lens, the hood being used for surrounding the human eye.

10. A detection system equipped with a white light source emitting white light and configured to detect a device to be detected, including a wearable apparatus, the wearable apparatus including a frame, a controller and LCD lenses, the controller and the LCD lenses being provided on the frame, wherein
the frame is used for fixing the LCD lenses in front of human eyes;
the controller is used for applying a predetermined voltage to the LCD lenses; and
the LCD lenses are used for displaying a color corresponding to the predetermined voltage according to the applied predetermined voltage, wherein
the wearable apparatus enables the detection system to detect, under the white light, a qualified rate of the device to be detected under light with any color.

11. The detection system according to claim 10, wherein the LCD lenses are also used for displaying a grayscale corresponding to the predetermined voltage according to the applied predetermined voltage.

12. The detection system according to claim 10, further including at least one slotted part, wherein the slotted part is provided at the outer side of the LCD lens, the slotted part being provided therein with an accommodating portion that is used for accommodating a filter or a polarizer, and the shape of the filter or the polarizer and the shape of the accommodating portion being set correspondingly.

13. The detection system according to claim 10, further including a rotation shaft and a slotted part, wherein the slotted part is provided therein with a filter or a polarizer, the slotted part being rotatably connected with the frame via the rotation shaft, and the slotted part being rotated about the rotation shaft to cover or expose the LCD lens, and wherein the device to be detected is a display panel.

14. The detection system according to claim 12, wherein the filter is provided thereon with a first handle, the first handle being fixedly connected with edge of the filter.

15. The detection system according to claim 13, wherein the filter is provided thereon with a first handle, the first handle being fixedly connected with edge of the filter.

16. The detection system according to claim 12, wherein the polarizer is provided thereon with a second handle, the second handle being fixedly connected with edge of polarizer, and wherein the device to be detected is a display panel.

17. The detection system according to claim 13, wherein the polarizer is provided thereon with a second handle, the second handle being fixedly connected with edge of the polarizer.

18. The detection system according to claim 10, further including a hood, wherein the hood is provided at the inner side of the LCD lens and is provided around the LCD lens, the hood being used for surrounding the human eye.

19. The detection system according to claim 10, wherein the wearable apparatus is spectacles, a helmet or a mask.

20. A detection method using a detection system in which a wearable apparatus is applied, the detection system equipped with a white light source emitting white light and configured to detect a device to be detected, the wearable apparatus including a frame, a controller and LCD lenses, the controller and the LCD lenses being provided on the frame, the controller being used for applying a predetermined voltage to the LCD lenses, and the LCD lenses being used for displaying a color corresponding to the predetermined voltage according to the applied predetermined voltage, the wearable apparatus enabling the detection system to detect, under the white light, a qualified rate of the device to be detected under light with any color, the detection method includes:
fixing the LCD lenses in front of human eyes by using the frame; and
applying a predetermined voltage to the LCD lenses through the controller, so that the LCD lenses display a color corresponding to the predetermined voltage under the action of the predetermined voltage.

* * * * *